United States Patent
Zhu

(10) Patent No.: US 10,975,974 B2
(45) Date of Patent: Apr. 13, 2021

(54) VALVE CORE

(71) Applicant: Jianlin Zhu, Taizhou (CN)

(72) Inventor: Jianlin Zhu, Taizhou (CN)

(73) Assignee: TAIZHOU RIVHOME ECO TECH CO., LTD., Taizhou (CN)

( * ) Notice: Subject to any disclaimer, the term of this patent is extended or adjusted under 35 U.S.C. 154(b) by 112 days.

(21) Appl. No.: 16/118,440

(22) Filed: Aug. 31, 2018

(65) Prior Publication Data

US 2020/0049265 A1 Feb. 13, 2020

(30) Foreign Application Priority Data

Aug. 7, 2018 (CN) .......................... 201810892344.6

(51) Int. Cl.
*F16K 11/085* (2006.01)
*F16K 5/04* (2006.01)
*F16K 5/18* (2006.01)
*F16K 5/06* (2006.01)

(52) U.S. Cl.
CPC ........ *F16K 11/0853* (2013.01); *F16K 5/0478* (2013.01); *F16K 5/0684* (2013.01); *F16K 5/188* (2013.01); *F16K 11/085* (2013.01); *Y10S 251/90* (2013.01); *Y10T 29/49421* (2015.01); *Y10T 137/86871* (2015.04)

(58) Field of Classification Search
CPC ...... F16K 5/188; F16K 5/0478; F16K 11/085; F16K 11/0853; F16K 5/0684; Y10T 137/86871; Y10S 251/90
See application file for complete search history.

(56) References Cited

U.S. PATENT DOCUMENTS

| 982,671 | A | * | 1/1911 | Hardy | ...................... A23L 2/42 99/493 |
| 1,803,773 | A | * | 5/1931 | Schmidt | .................. F16K 5/204 251/160 |
| 2,233,074 | A | * | 2/1941 | Corbin, Jr. | ............ F16K 5/0605 137/584 |

(Continued)

FOREIGN PATENT DOCUMENTS

| CN | 200420114451.X | 1/2007 |
| CN | 201210006655.0 | 7/2012 |

(Continued)

*Primary Examiner* — Matthew W Jellett
*Assistant Examiner* — Christopher D Ballman
(74) *Attorney, Agent, or Firm* — Minder Law Group; Willy H. Wong

(57) ABSTRACT

A valve core comprises a columnar body with a first water passage hole, a buffer groove being disposed on the body and located at an outside of the first water passage hole; a sealing block matched with the buffer groove and being disposed inside the buffer groove; wherein a partitioning portion is disposed between the buffer groove and the first water passage hole, a connection hole is disposed in the partitioning portion capable of communicating the buffer groove with the first water passage hole. through the provision of the partitioning portion, avoids the direct impact of the water flow on the sealing block, and eliminates the unstable factors caused by water flow on the sealing block, so that the sealing block is pressed tightly on an inner wall of a valve body.

7 Claims, 8 Drawing Sheets

(56) References Cited

U.S. PATENT DOCUMENTS

| | | | | |
|---|---|---|---|---|
| 2,371,657 | A * | 3/1945 | Stark | F16K 11/085 251/182 |
| 2,391,278 | A * | 12/1945 | Stark | F16K 5/0478 251/175 |
| 2,418,404 | A * | 4/1947 | Greenlee | F16K 5/0471 251/312 |
| 2,433,732 | A * | 12/1947 | Brown | F16K 5/0464 251/175 |
| 2,475,702 | A * | 7/1949 | Funke | B05B 1/1636 210/422 |
| 2,506,097 | A * | 5/1950 | Melichar | F16K 5/0478 137/625.11 |
| 2,945,669 | A * | 7/1960 | Gallagher | F16K 5/204 251/309 |
| 3,155,368 | A * | 11/1964 | Shafer | F16K 5/0684 251/175 |
| 3,195,857 | A * | 7/1965 | Shafer | F16K 27/107 251/309 |
| 3,284,046 | A * | 11/1966 | Allenbaugh, Jr. | F16K 5/0684 251/315.08 |
| 3,314,645 | A * | 4/1967 | Temple | F16K 5/184 251/317 |
| 3,349,799 | A * | 10/1967 | Mueller | F16K 5/0407 137/625.22 |
| 3,480,042 | A * | 11/1969 | Hood | F16K 5/0478 137/625.22 |
| 3,497,179 | A * | 2/1970 | Smyers, Jr. | F16K 5/0478 251/175 |
| 3,787,028 | A * | 1/1974 | Semon | F16K 5/185 251/317 |
| 4,015,816 | A * | 4/1977 | Semon | F16K 5/0478 251/285 |
| 4,022,427 | A * | 5/1977 | Read | E21B 34/12 251/343 |
| 4,130,128 | A * | 12/1978 | Kaneko | F16K 5/0605 137/269 |
| 4,548,385 | A * | 10/1985 | Barbuto | F16K 11/0853 251/175 |
| 5,188,144 | A * | 2/1993 | Radossi | F16K 5/0478 137/315.25 |
| 5,522,430 | A * | 6/1996 | Mittersteiner Urzua | F16K 5/0478 137/625.47 |
| 5,577,708 | A * | 11/1996 | Pfannenschmidt | F16K 5/0605 251/315.11 |
| 5,947,443 | A * | 9/1999 | Shellenbarger | F16K 5/0478 251/181 |
| 6,302,373 | B1 * | 10/2001 | Lee | F16K 5/0636 137/557 |
| 6,681,805 | B2 * | 1/2004 | McLane | B60H 1/00485 137/625.46 |
| 7,210,668 | B2 * | 5/2007 | Wilfert | F16K 5/188 251/174 |
| 7,497,415 | B2 * | 3/2009 | Chang | F16K 5/0414 251/310 |
| 7,503,345 | B2 * | 3/2009 | Paterson | F16K 5/0407 137/625.47 |
| 7,849,877 | B2 * | 12/2010 | Tan | F16K 11/076 137/625.46 |
| 9,050,613 | B2 * | 6/2015 | Bishop | B05B 7/30 |
| 9,103,448 | B2 * | 8/2015 | Witkowski | F16K 5/0457 |
| 2009/0120519 | A1 * | 5/2009 | Chen | F16K 11/0853 137/625.46 |
| 2014/0183395 | A1 * | 7/2014 | Popke | F16K 39/00 251/283 |
| 2017/0321814 | A1 * | 11/2017 | Aoki | F16K 11/0856 |
| 2018/0245703 | A1 * | 8/2018 | Chen | F16K 1/46 |

FOREIGN PATENT DOCUMENTS

| | | |
|---|---|---|
| CN | 201420424535.7 | 1/2015 |
| CN | 201621495717.9 | 1/2018 |
| CN | 201721120638.4 | 4/2018 |

* cited by examiner

VALVE CORE

RELATED APPLICATIONS

This application claims priority to China Patent Application No. 201810892344.6 filed Aug. 7, 2018.

The applications and all patents, patent applications, articles, books, specifications, other publications, documents, and things referenced herein are hereby incorporated herein in their entirety for all purposes. To the extent of any inconsistency or conflict in the definition or use of a term between any of the incorporated publications, documents, or things and the text of the present document, the definition or use of the term in the present document shall prevail.

BACKGROUND OF THE INVENTION

Field of Invention

The present invention belongs to the technical field of valves and relates to a valve core.

Related Art

The valve core is applied in a valve body for controlling or switching the waterways. Using the three-way valve as an example, the valve body has three ports, one ingress and two egress or two ingress and one egress. For a valve with one ingress and two egress, the inlet is fixed, and the switching between different outlets is realized by the rotation of the valve core. Similarly, for a valve with two ingress and one egress, the outlet is fixed, and switching between different inlets are realized by the rotation of the valve core. When one inlet is connected to one outlet, the other outlet or inlet requires sealing by the valve core. Traditionally, an outer wall of the valve core is directly pressed against an inner wall of the valve body tightly to achieve sealing with relative low reliability, and it is easy to leak when being worn down after using for a long time.

In view of the above problems, one prior art disclosed a single-flap three-way valve, which comprises a valve body, a valve body groove is disposed in the valve body, and the valve body groove is respectively connected with three sections of pipelines. The three sections of pipelines form a T-shaped structure. Inside the valve body groove is installed with a valve core, and a semi-cylindrical valve flap is disposed between two corresponding grooves of upper and lower chucks. A semi-circular hole is opened in the vertical direction of the valve flap to form a passage that can correspondingly communicate with the three sections of pipelines respectively. A valve pole is installed in the groove of the upper chuck, and the natural pressure of the medium acts on the valve flap for flexible controlling and rigid sealing. Similarly, another prior art disclosed a three-way valve core comprising a body having a connecting portion at a top portion thereof for connecting a valve pole or a handle. A lateral portion of the body is disposed with a passage hole for the medium to pass through, the passage hole includes a first through hole and a second through hole which are both penetratingly opened on the lateral portion of the body, and the first through hole and the second through hole are crisscross disposed and can communicate with each other. A gasket is connected on a side wall of the body at a port of one end of the first through hole, and the gasket covers the port of the first through hole and seals the port.

In the above two patent applications, a valve flap or a gasket is disposed on the valve core to seal the outlet or inlet of the valve body, and the water pressure in the valve body acts on the valve flap or the gasket to increase the pressing force between the valve flap or the gasket and the valve body in order to ensure the seal tightness. However, in the actual application process, one inlet of the valve body is directly connected with the valve flap or the gasket, and the incoming water flow has a large impact force at this time; that is, the water flow will directly impact the valve flap or gasket. At the same time, the flow velocity of the water flow will change, and the flow direction of the water flow is also unstable, resulting in repeated changes in the magnitude and direction of the force received by the valve flap or the gasket, and the force received is uneven, which may easily cause excessive deformation of the valve flap or the gasket partially, and even phenomenon such as displacement affecting the seal tightness. To tackle the defect, technical personnel skilled in the art can easily think of improving the assembly precision of the valve flap or the gasket to ensure the stability of the valve flap or the gasket. However, it is obvious that the valve flap or the gasket will wear down after a long period of use. The assembly precision is difficult to be guaranteed continuously, thus the use of a rigid valve flap or gasket is also conceived to avoid the deformation defect. But the rigid material will also wear down after a long period of use. At this point, the valve flap or the gasket will lose its expansive force, it is only pressed tightly against an inner wall of the valve body by water pressure, and the sealing effect is limited. At the same time, the inlet of the valve body has a large diameter, the water flow acts on the gasket and achieves sealing by water pressure, and the large diameter of the inlet makes the contact area of the water flow and the gasket large, which easily causes deformation of the gasket and affects the seal tightness.

SUMMARY OF THE INVENTION

One object of one embodiment of the present invention is to solve the above technical problems in the prior art, and proposes a valve core for solving the problem of poor seal tightness of the valve core.

One object of one embodiment of the present invention can be achieved by the following technical solutions: A valve core, comprising a columnar body, a side wall of the body being disposed with crisscross connected first water passage hole and at least one second water passage hole, the second water passage hole being located on one side of the first water passage hole, the side wall of the body being disposed with a buffer groove on another side of the first water passage hole, a sealing block is disposed inside the buffer groove, wherein a partitioning portion is disposed between the buffer groove and the first water passage hole, a connection hole is disposed in the partitioning portion for communicating the buffer groove with the first water passage hole, a hole diameter of the connection hole is smaller than a hole diameter of the second water passage hole.

When in use, one embodiment of the valve core is rotatably disposed in a valve body, and the valve body is disposed with water openings. Through the rotation of the valve core, the sealing block seals one of the water openings on the valve body, and the first water passage hole and the second water passage hole communicate with the other water openings on the valve body, thereby realizing switching of waterways. The second water passage hole and the buffer groove of the body are respectively located on the both sides of the first water passage hole. In the water passing process, the water flowing into the second water passage hole has a larger flow rate. Different from a prior art three-way valve, where the water flowing through the second water passage hole directly impacts the gasket, a partitioning portion is formed between the buffer groove and the first water passage hole in the body, the partitioning portion separates the sealing block in the buffer groove from the first water passage hole and the second water passage hole, so that the water flowing through the second water passage hole only impacts the partitioning portion without directly impacting the sealing block. Thus avoiding deformation and displacement of the sealing block caused by unstable changes such as water flow rate and flow direction, thereby improving the sealing stability of the sealing block. At the same time, the connection hole is opened in the partitioning portion, and the hole diameter of the connection hole is smaller than the hole diameter of the second water passage hole, Therefore, it is difficult for the water flowing through the second water passage hole to pass through quickly, but the buffer groove can be kept at the same water pressure as the first water passage hole and the second water passage hole. Thereby using the water pressure to act on the sealing block, so that the sealing block is pressed tightly against an inner wall of the valve body. In other words, the present application eliminates the unstable factors caused by the water flow on the sealing block through the partitioning portion, and the water pressure in the buffer groove is equalized by the connection hole having a smaller hole diameter. Thereby with the combination of the partitioning portion and the connection hole, water seepage is prevented at the seal joint of the sealing block, and the seal tightness is improved.

In one embodiment of the above-mentioned valve core, one end of the connection hole connecting with the buffer groove is located at a center position of the buffer groove. Even if there is water flowing through the connection hole at a low flow rate, it acts on a center position of the sealing block, avoiding the sealing block being subjected to uneven force and improving the sealing stability of the sealing block.

In one embodiment of the above-mentioned valve core, the sealing block is slidably inserted into the buffer groove, and a guide portion capable of guiding the sealing block is disposed in the buffer groove. Under the action of water pressure, the sealing block has a tendency to move outward and press tightly against the inner wall of the valve body. Even if outer sides of the sealing block are worn down due to a long time usage, the sealing block can move outward under the action of water pressure to adjust its position in order to ensure its seal tightness. The guide portion guides the sealing block, so that the functional position of the sealing block can be kept precisely at all times, thereby ensuring the sealing stability.

In one embodiment of the above-mentioned valve core, the guide portion is located at a center position of a bottom surface of the buffer groove, the guide portion protrudes in a round platform shape, a guide hole is disposed on an inner end surface of the sealing block, and the guide portion is inserted into the guide hole. The sealing block and the guide portion are sleeved structures. Even if the position of the sealing block is adjusted outwardly, a cylindrical groove is also formed between a bottom surface of the guide hole and an end face of the guide portion, water pressure acts on the bottom surface of the guide hole, and the force acting on the sealing block is relatively uniform. Thus, the stability of the sealing block is always guaranteed.

In one embodiment of the above-mentioned valve core, the end of the connection hole connecting with the buffer groove penetrates to the end face of the guide portion and is located at a center position of the end face of the guide portion. Similarly, the water flow entering the connection hole acts on a center position of the bottom surface of the guide hole, that is, acts on the center position of the sealing block to avoid the sealing block being subjected to uneven force and affects the stability.

In one embodiment of the above-mentioned valve core, the bottom surface of the guide hole has an annular sealing convex brim in a circumferential direction, the sealing convex brim is pressed tightly against the end face of the guide portion, and the end of the connection hole connecting with the buffer groove is located at an inner side of the sealing convex brim. Before the sealing block is worn down, the sealing convex brim is in a compressed state, and after its deformation, a tight sealing can be formed around the connection hole to prevent water from seeping between the sealing block and the buffer groove, thereby ensuring the seal tightness. Of course, the deformation of the sealing convex brim can also provide an outward elastic thrust for the sealing block, thereby improving the bonding force between the sealing block and the inner wall of the valve body, and ensuring the seal tightness.

In one embodiment of the above-mentioned valve core, the hole diameter of the connection hole is $\frac{1}{7}$ to $\frac{1}{3}$ of the hole diameter of the second water passage hole. The hole diameter of the connection hole is made smaller to avoid the influence of the water flow on the sealing block, and the water flow can slowly enter the buffer groove through the connection hole.

In one embodiment of the above-mentioned valve core, the buffer groove is a rectangular groove, the sealing block is made of rubber or silicone rubber material, the sealing block is matched with the buffer groove and located in the buffer groove, and an outer end surface of the sealing block is an arcuate surface. groove the rectangular structure can prevent the sealing block from rotating circumferentially relative to the buffer groove, thereby making the sealing block more stable.

In one embodiment of the above-mentioned valve core, the quantity of the second water passage hole is one, and center lines of the second water passage hole and the connection hole are perpendicular to a center line of the first water passage hole. The valve core is applied to a three-way or four-way valve body, that is, three or four water openings are disposed on the valve body, the sealing block seals one of the water openings, and the first water passage hole and the second water passage hole can communicate with the remaining two or three water openings. Because the connection hole is perpendicular to the first water passage hole, the water flow does not directly enter the connection hole when entering through the first water passage hole, thereby eliminating the influence of the running water impacting on the sealing block.

In one embodiment of the above-mentioned valve core, an outer diameter of the guide portion is larger than the hole diameters of the first water passage hole and the second water passage hole. The sealing block having a larger force receiving area is realized when a groove is formed between the buffer groove as well as the bottom surface of the guide hole and the end face of the guide portion, thereby reducing the influence of local deformation and the like on the stability due to the concentration of force received, and forming a larger sealing area between the sealing block and the body.

Compared with the prior art, one embodiment of the valve core has the following advantages:

1. Since the present application, through the provision of the partitioning portion, avoids the direct impact of the water flow on the sealing block, and eliminates the unstable factors caused by the water flow on the sealing block, and the water pressure in the buffer groove is equalized by the connection hole with a smaller hole diameter, so that the sealing block is pressed tightly on the inner wall of the valve body. Thereby with the combination of the partitioning portion and the connection hole, water seepage is prevented at the seal joint of the sealing block, and the seal tightness is improved.

2. Since the sealing block and the guide portion are slidably sleeved, the sealing block has a tendency to move outward and press tightly against the inner wall of the valve body under the action of water pressure. Even if the outer sides of the sealing block are worn down due to a long time usage, the sealing block can move outward under the action of water pressure to adjust its position in order to ensure its seal tightness. The guide portion guides the sealing block, so that the functional position of the sealing block can be kept precisely at all times, thereby ensuring the sealing stability.

3. Since the bottom surface of the guide hole has the sealing convex brim in a circumferential direction, the deformation of the sealing convex brim can also provide an outward elastic thrust for the sealing block, thereby improving the bonding force between the sealing block and the inner wall of the valve body, and ensuring the seal tightness.

DETAILED DESCRIPTION OF THE INVENTION

The technical solutions of the present invention are further described below with reference to the specific embodiments of the present invention in conjunction with the accompanied drawings, but the present invention is not limited to the embodiments.

Embodiment 1

Figure 1:
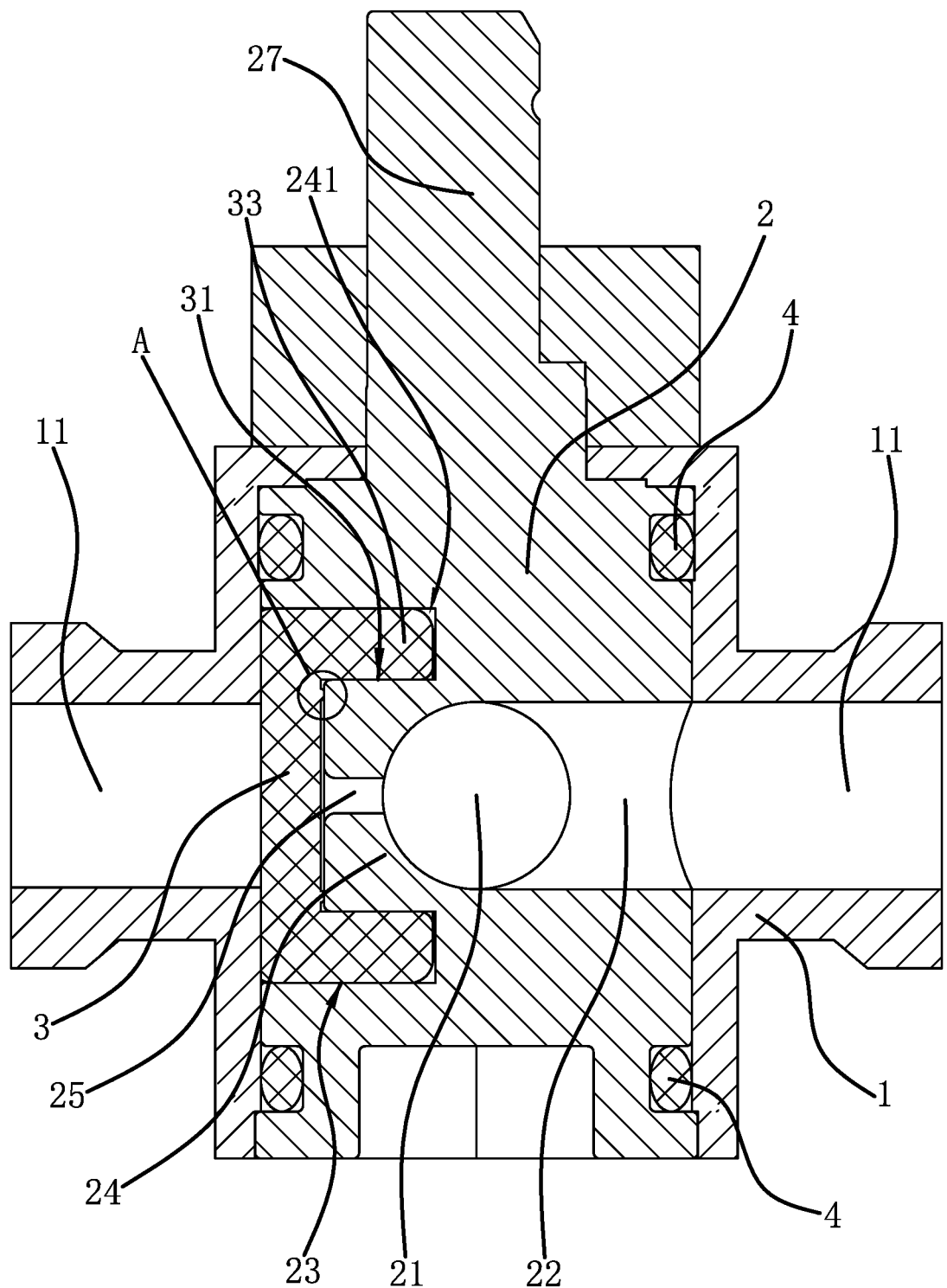
FIG. 1 is a longitudinal cross-sectional view of one embodiment of a three-way valve.
Figure 2:
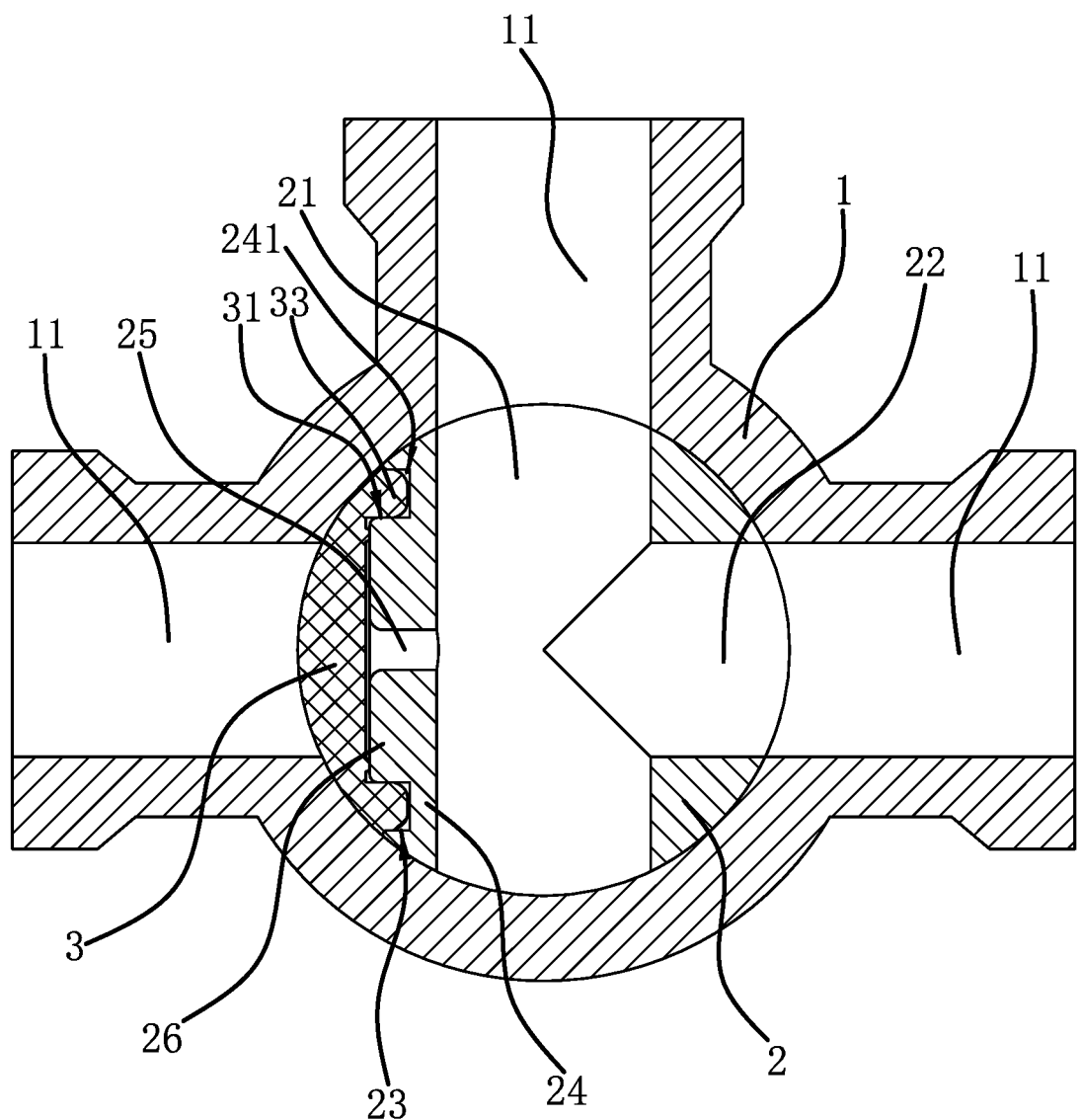
FIG. 2 is a transverse cross-sectional view of one embodiment of the three-way valve.
Figure 3:
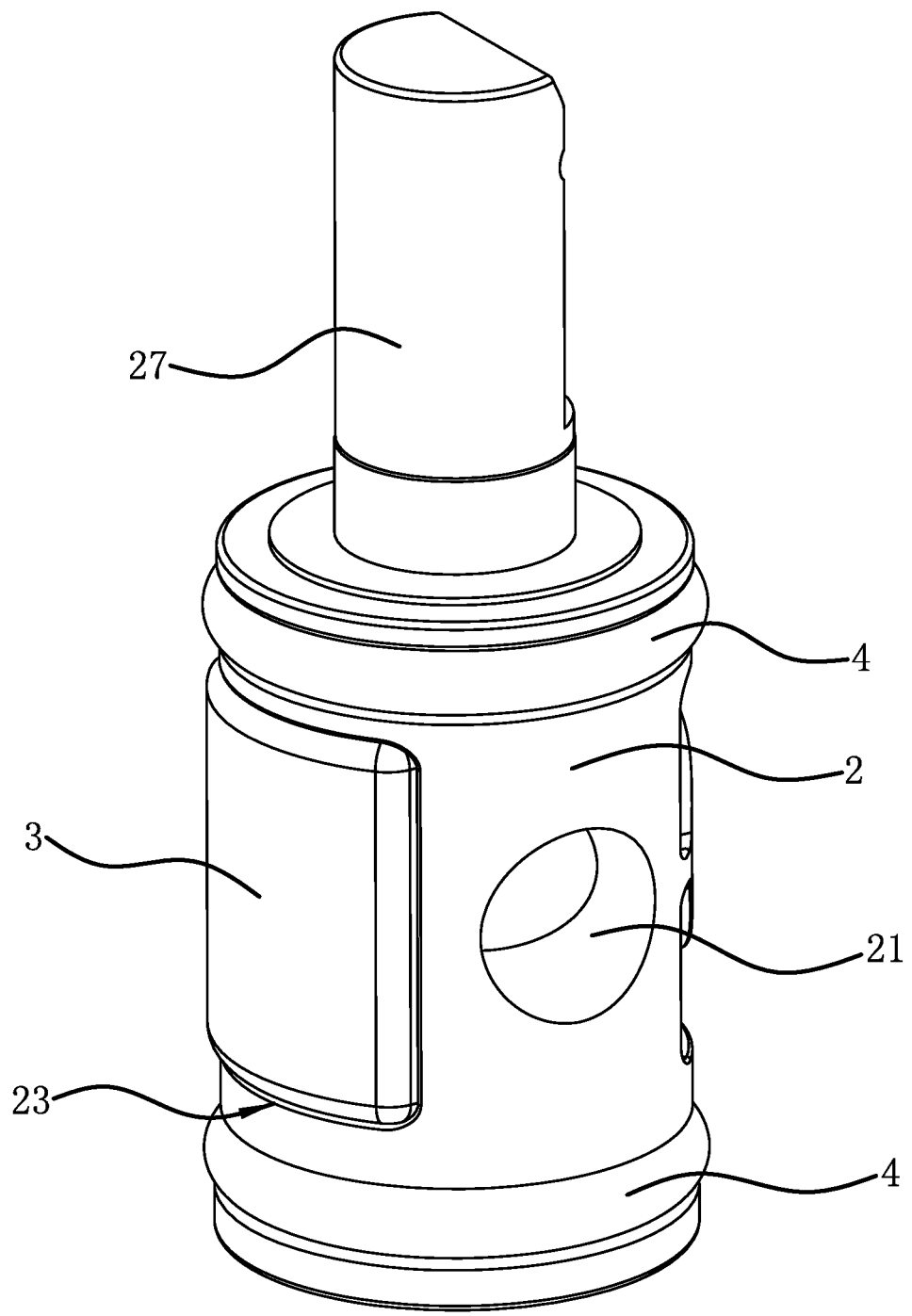
FIG. 3 is a perspective view of one embodiment of a valve core.

As shown in FIG. 1, one embodiment of a valve core comprises a body 2, the valve core is applied to a three-way valve body 1, and the body 2 is in a columnar shape. A lower end of the valve body 1 has an open shape, and an upper end thereof is closed. The body 2 is rotatably disposed in the valve body 1, an upper end of the body 2 has a valve pole 27, and the valve pole 27 protrudes upwardly from the valve body 1. A pressure block is fixedly disposed at an upper end of the valve pole 27, and the pressure block is pressed against an upper end surface of the valve body 1, thereby achieving the positioning of the body 2. A sealing ring 4 is respectively sleeved on the outer walls of both ends of the body 2, and the sealing rings 4 are pressed tightly against an inner wall of the valve body 1, thereby sealing the two ends of the body 2. As shown in conjunction with FIG. 2, the valve body 1 has three water openings 11, the three water openings 11 are arranged in a T-shape; that is, two of the water openings 11 are on the same straight line, and the third water opening 11 is perpendicular to the other two water openings 11. A first water passage hole 21 and a second water passage hole 22 are disposed on a side wall of the body 2, wherein the first water passage hole 21 penetrates through the side walls of the body 2 in the radial direction, the second water passage hole 22 is located on one side of the first water passage hole 21, the second water passage hole 22 is disposed in the radial direction, the second water passage hole 22 is perpendicular to the first water passage hole 21, and an inner end of the second water passage 22 is connected with the first water passage hole 21. As shown in conjunction with FIG. 3, the outer wall of the body 2 is further disposed with a buffer groove 23, the buffer groove 23 is located on another side of the first water passage hole 21, and the buffer groove 23 and the second water passage hole 22 are oppositely disposed. A sealing block 3 is disposed in the buffer groove 23, an outer side of the sealing block 3 is pressed tightly against the inner wall of the valve body 1. As shown in FIG. 2, when one end of the first water passage hole 21 connects with one of the water openings 11, and the second water passage hole 22 is communicated with the other water opening 11, the sealing block 3 can seal the third water opening 11, and another end of the first water passage hole 21 is sealed by the inner wall of the valve body 1. By rotating the body 2, the two ends of the first water passage hole 21 are respectively connected with two of the water openings 11, and the third water opening 11 is sealed by the sealing block 3, thereby realizing the switching of the waterways.

Further, one embodiment of a partitioning portion 24 is disposed between the buffer groove 23 and the first water passing hole 21, and the partitioning portion 24 can block the communication between the buffer groove 23 and the first water passage hole 21 as well as the second water passage hole 22. Therefore, when it is in the state of FIG. 2, the water flow entering through the first water passage hole 21 only impacts the partitioning portion 24 without directly impacting the sealing block 3. Thus avoiding deformation and displacement of the sealing block 3 caused by unstable changes such as water flow rate and flow direction, thereby improving the sealing stability of the sealing block 3. The partitioning portion 24 is disposed with a connection hole 25 communicating the buffer groove 23 with the first water passage hole 21, and a hole diameter of the connection hole 25 is smaller than a hole diameter of the second water passage hole 22. Preferably, the hole diameter of the connection hole 25 is 1/5 of the hole diameter of the second water passage hole 22. Therefore, it is difficult for the water entering through the second water passage hole 22 to pass through quickly, but the buffer groove 23 can be kept at the same water pressure as the first water passage hole 21 and the second water passage hole 22. Thereby using the water pressure to act on the sealing block 3, so that the sealing block 3 is pressed tightly against the inner wall of the valve body 1 to ensure the seal tightness at the sealing block 3.

Figure 4:
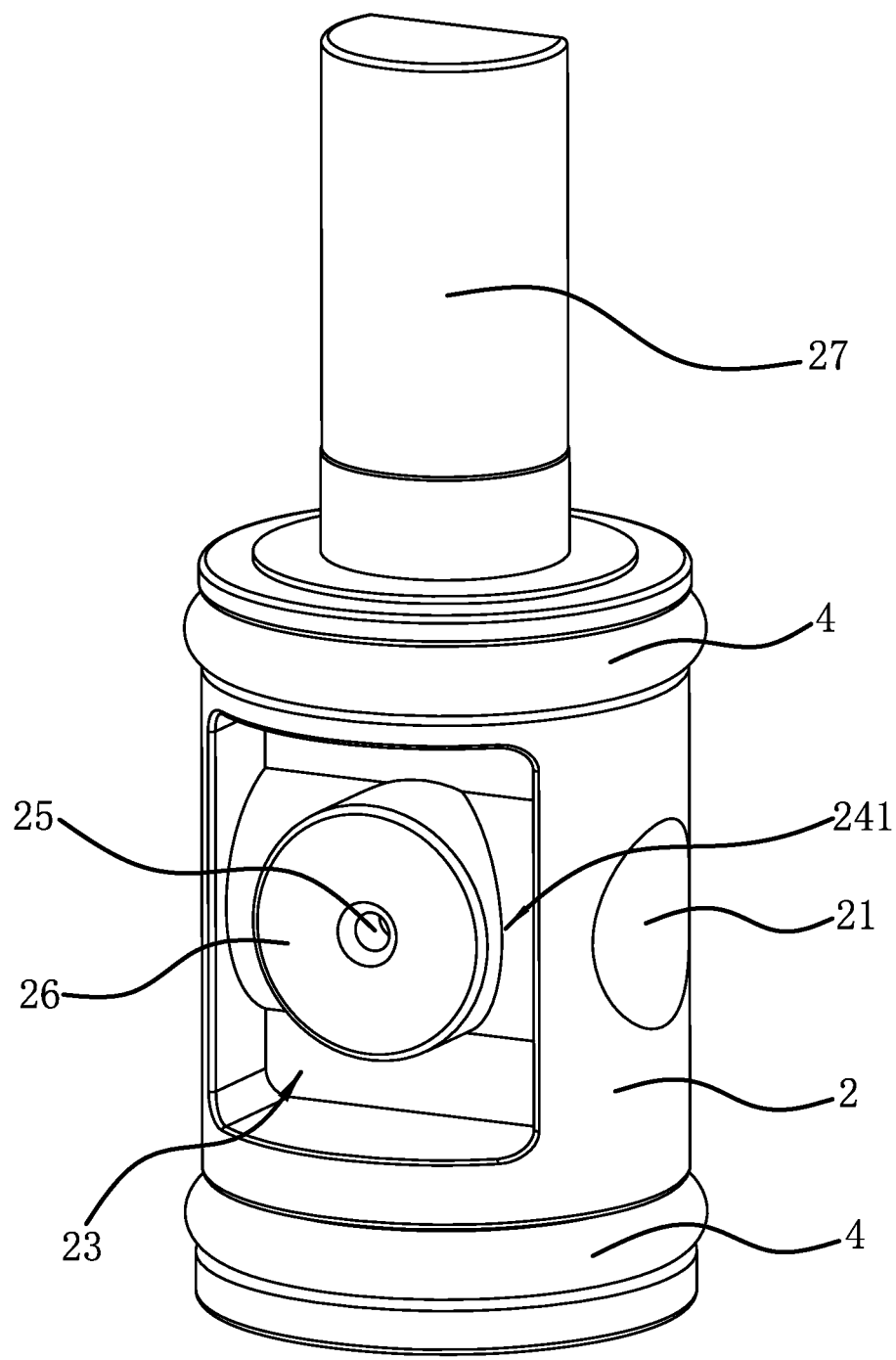
FIG. 4 is a perspective view of one embodiment of a body.
Figure 5:
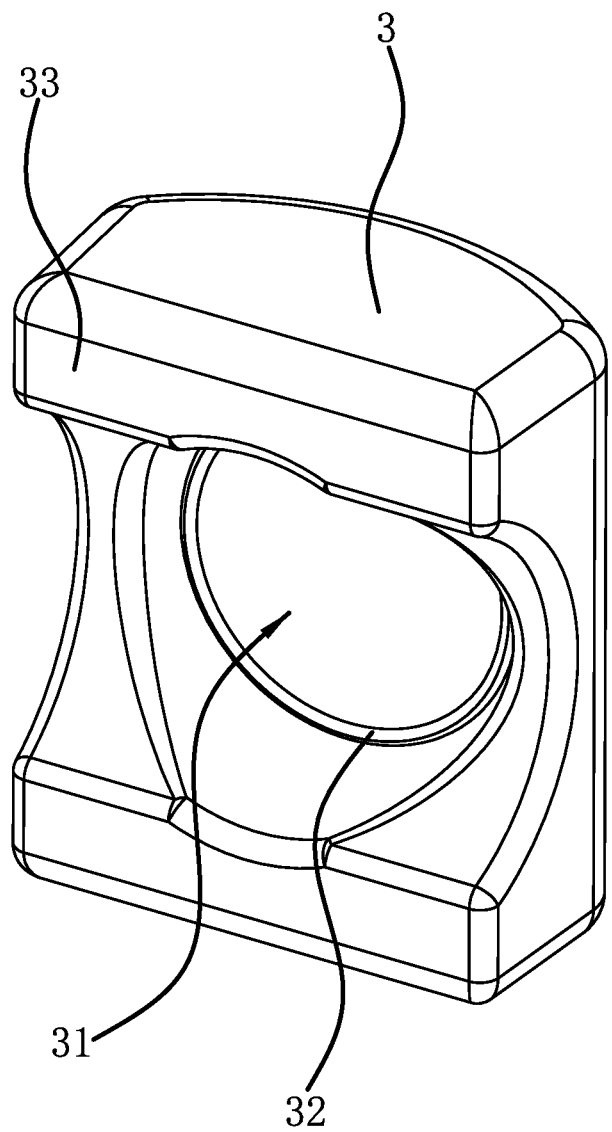
FIG. 5 is a perspective view of one embodiment of a sealing block.
Figure 6:
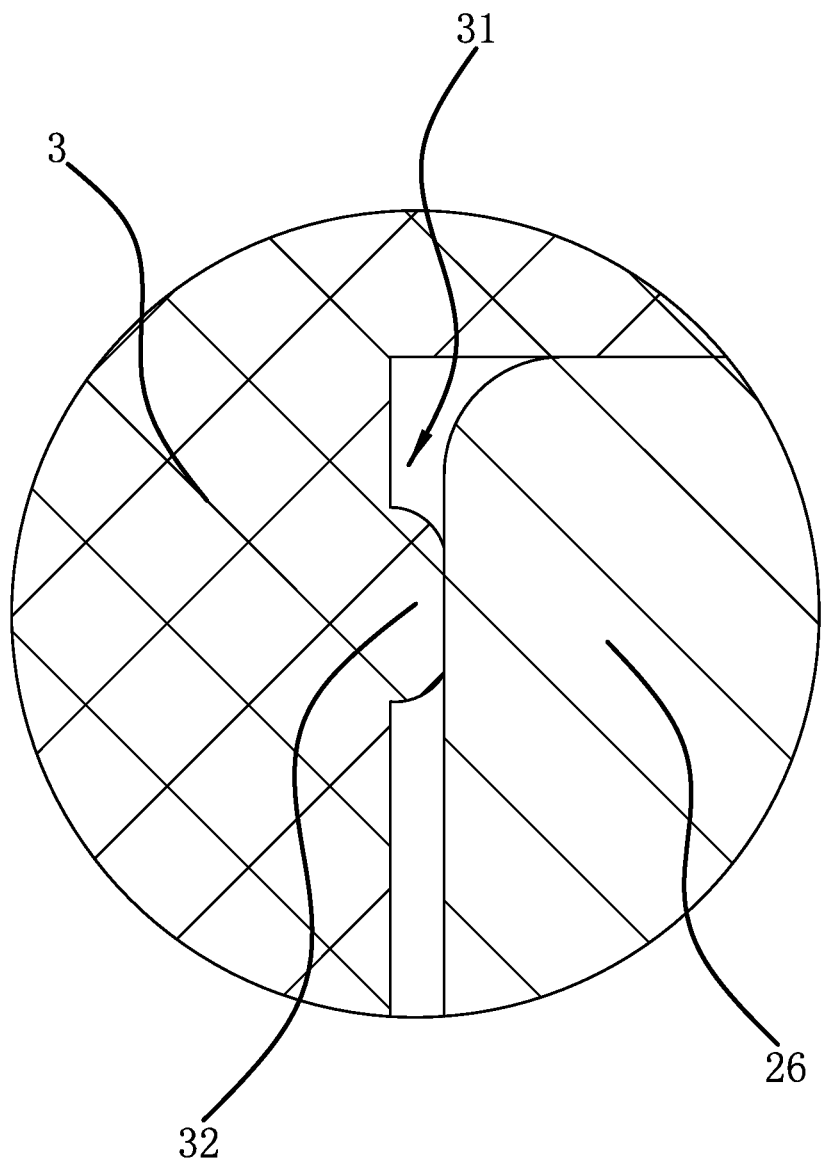
FIG. 6 is an enlarged view at A in FIG. 1.

Specifically, as shown in conjunction with FIG. 4, a bottom surface of one embodiment of the buffer groove 23 has a protruded round platform shaped guide portion 26, the guide portion 26 is located at a center position of the bottom surface of the buffer groove 23, and an outer diameter of the guide portion 26 is larger than the hole diameters of the first water passage hole 21 and the second water passage hole 22. As shown in conjunction with FIG. 5, a guide hole 31 is disposed on an inner end surface of the sealing block 3, the sealing block 3 is slidably inserted into the buffer groove 23, and the guide portion 26 is inserted into the guide hole 31; in other words, the guide portion 26 can guide the sealing block 3. The connection hole 25 is a straight hole, a center line of the connection hole 25 is collinear with a center line of the second water passage hole 22. An end of the connection hole 25 connecting with the buffer groove 23 penetrates to an end face of the guide portion 26 and is located at a center position of the end face of the guide portion 26; that is, the end of the connection hole 25 connecting with the buffer groove 23 is located at the center position of the buffer groove 23. The buffer groove 23 is a rectangular groove, the sealing block 3 is made of rubber or silicone rubber material, the sealing block 3 is just matched with the buffer groove 23 and located in the buffer groove 23, and an outer end surface of the sealing block 3 is an arcuate surface and pressed tightly against the inner wall of the valve body 1. As shown in conjunction with FIG. 6, a bottom surface of the guide hole 31 has an annular sealing convex brim 32 in a circumferential direction, the sealing convex brim 32 is pressed tightly against the end face of the guide portion 26, and the end of the connection hole 25 connecting with the buffer groove 23 is located at an inner side of the sealing convex brim 32.

Embodiment 2

Figure 7:
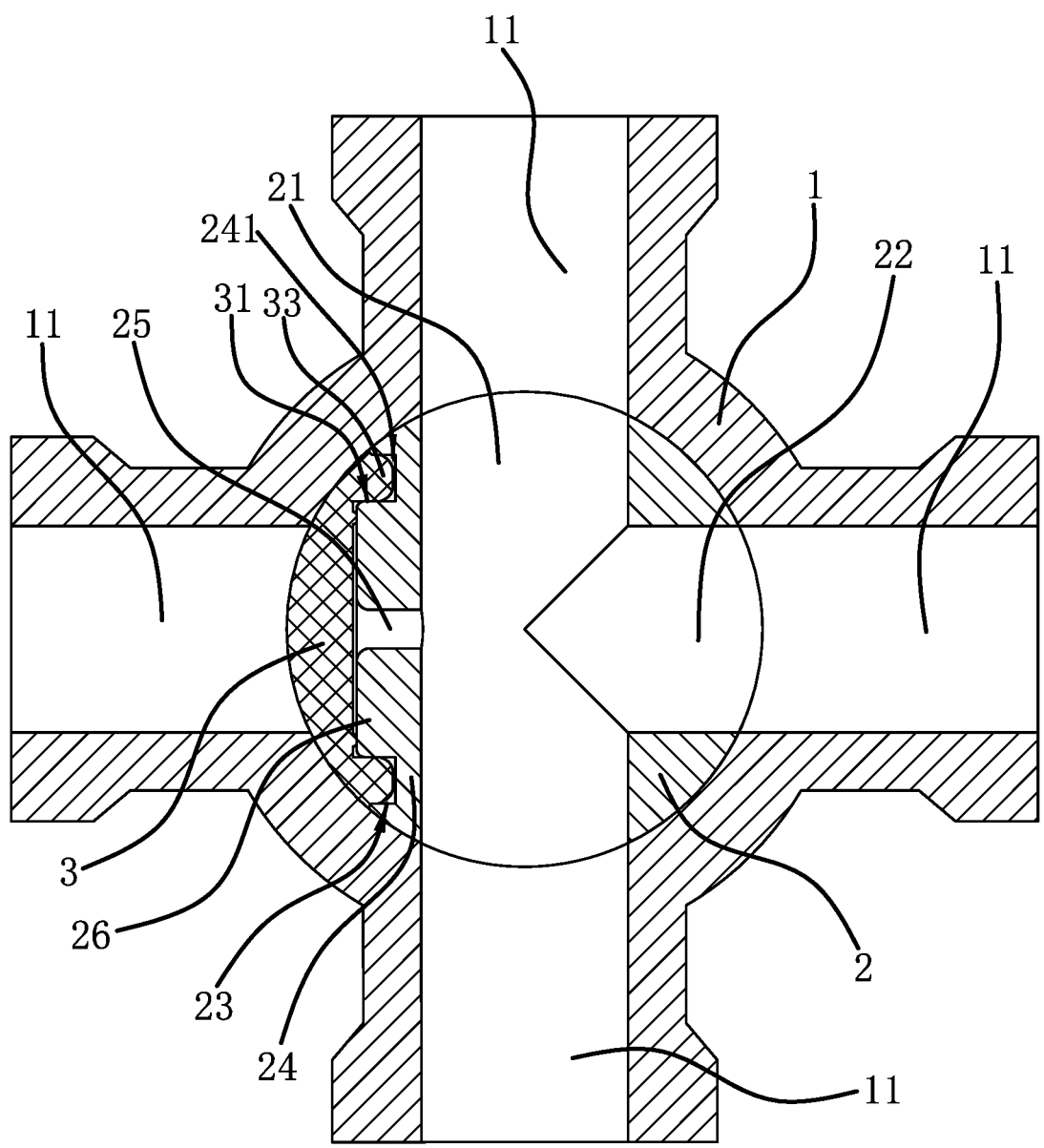
FIG. 7 is a cross-sectional view of one embodiment of a four-way valve.

The structure of the valve core is basically the same as that of the first embodiment. The differences lie in, as shown in FIG. 7, the valve core is applied to the four-way valve body 1, and the valve body 1 is disposed with the four water openings 11. The sealing block 3 seals one of the water openings 11, the two ends of the first water passage hole 21 connect with two of the water openings 11 respectively, and the second water passage hole 22 communicate with the one water opening 11.

Embodiment 3

Figure 8:
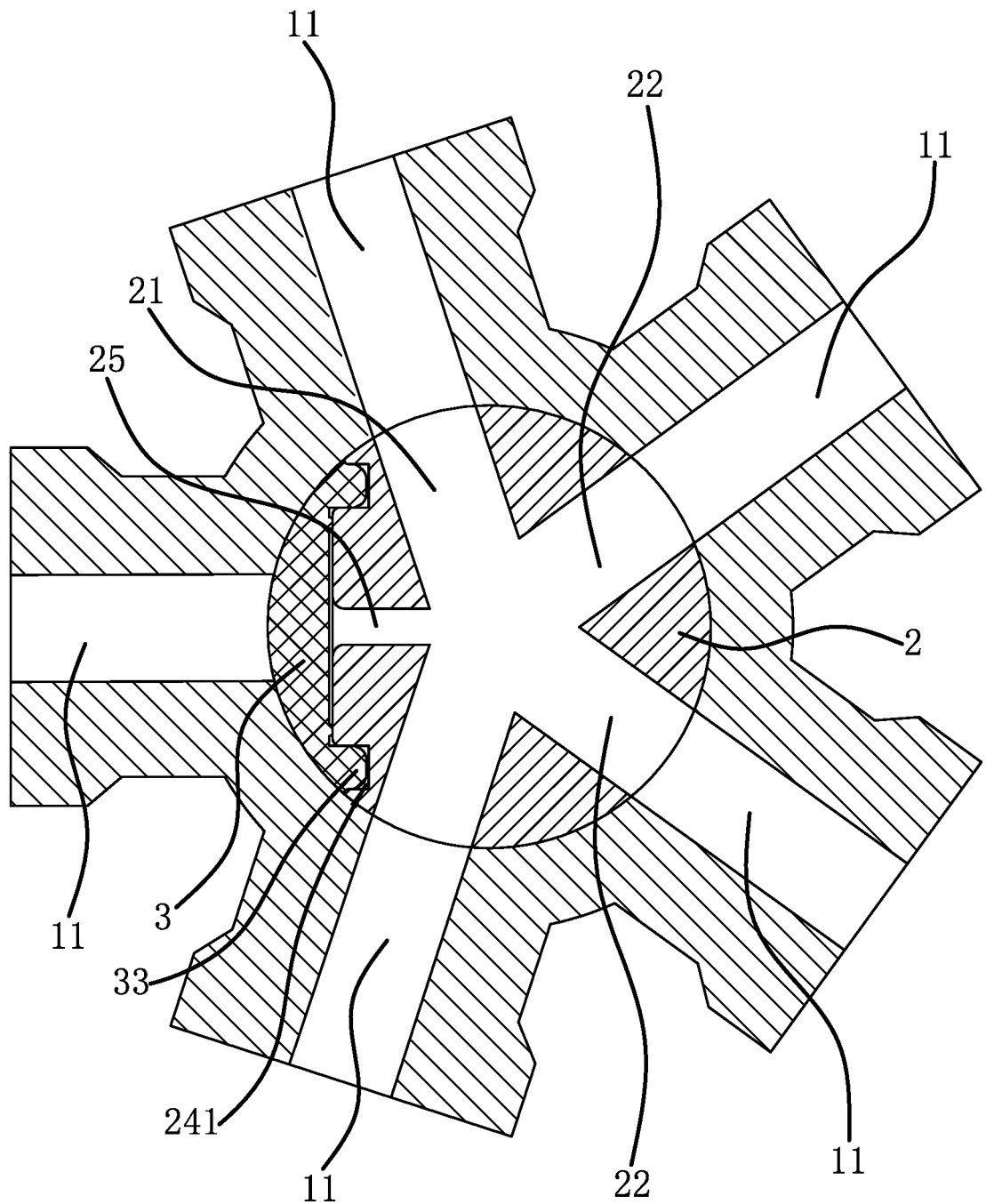
FIG. 8 is a cross-sectional view of one embodiment of a five-way valve.

The structure of the valve core is basically the same as that of the first embodiment. The differences lie in, as shown in FIG. 8, the valve core is applied to the five-way valve body 1, the body 2 is disposed with the first water passage hole 21 and the two second water passage holes 22, and the valve body 1 is disposed with the five water openings 11. The sealing block 3 seals one of the water openings 11, the two ends of the first water passage hole 21 connect with two of the water openings 11 respectively, and the two second water passage holes 22 communicate with the two water openings 11 respectively.

The specific embodiments described herein are merely illustrative of the scope of the present invention. Technical personnel skilled in the art to which the present invention pertains can make various modifications or additions to the specific embodiments described or replace them in a similar manner, without departing from the spirit of the present invention or beyond the scope defined by the appended claims.

Although the terms valve body 1, water openings 11, body 2, and the like are used more frequently herein, the possibility of using other terms is not excluded. These terms are merely used to describe and explain the nature of the present invention more conveniently; construing them as any of the additional restrictions is contrary to the scope of the present invention.

LIST OF REFERENCE NUMERALS 1 valve body
11 water opening
2 body
21 first water passage hole
22 second water passage hole
23 buffer groove
24 partitioning portion
241 annular groove
25 connection hole
26 guide portion
27 valve pole
3 sealing block
31 guide hole
32 sealing convex brim
33 annular convex
4 sealing ring

What is claimed is:

1. A valve core, comprising:
a columnar body with a first water passage hole;
at least one second water passage hole disposed in the body and crisscross connected with the first water passage hole, the second water passage hole being located on a first side of the first water passage hole;
a buffer groove being disposed on the body and located at an outside of the first water passage hole;
a sealing block matched with the buffer groove and being slidably inserted into the buffer groove; and
a partitioning portion disposed between the buffer groove and the first water passage hole;
wherein the sealing block is made of rubber or silicone rubber material;
wherein an annular convex defining a guide hole is integrally fixed to the sealing block, and the guide hole is disposed at a center position of an inner end surface of the sealing block;
wherein an annular groove is provided in the partitioning portion, and the annular convex is inserted in the annular groove;
wherein a guide portion capable of guiding the sealing block is integrally fixed to the partitioning portion, the guide portion is located at a center position of a bottom surface of the buffer groove, and the guide portion is inserted into the guide hole and protrudes in a round platform shape;
wherein a connection hole is disposed in the partitioning portion, a first end of the connection hole penetrates through an outer end face of the guide portion to communicating the buffer groove with the first water passage hole; and
wherein a bottom surface of the guide hole has an annular sealing convex brim made of rubber or silicone rubber material in a circumferential direction, the sealing convex brim is integrally fixed to the sealing block and pressed tightly against an outer end face of the guide portion, and the first end of the connection hole communicating with the buffer groove is located at an inner side of the sealing convex brim.

2. The valve core as claimed in claim 1, wherein a hole diameter of the connection hole is smaller than a hole diameter of the second water passage hole.

3. The valve core as claimed in claim 2, wherein a hole diameter of the connection hole is 1/7 to 1/3 of a hole diameter of the second water passage hole.

4. The valve core as claimed in claim 2, wherein there is only one second water passage hole, and center lines of the second water passage hole and the connection hole are perpendicular to a center line of the first water passage hole.

5. The valve core as claimed in claim 2, wherein an outer diameter of the guide portion is larger than a hole diameter of the first water passage hole and the hole diameter of the second water passage hole.

6. The valve core as claimed in claim 1, wherein the first end of the connection hole is located at a center position of the end face of the guide portion.

7. The valve core as claimed in claim 1, wherein the buffer groove is a rectangular groove, and an outer end surface of the sealing block is an arcuate surface.

* * * * *